United States Patent
Rammer et al.

(10) Patent No.: US 7,523,736 B2
(45) Date of Patent: Apr. 28, 2009

(54) DEVICE FOR INCREASING THE BRAKING POWER OF A MULTI-CYLINDER INTERNAL COMBUSTION ENGINE OF A VEHICLE DURING AN ENGINE BRAKING OPERATION

(75) Inventors: Franz Rammer, Wolfern (AT); Franz Leitenmayr, Perg (AT); Gottfried Raab, Perg (AT)

(73) Assignee: MAN Nutzfahrzeuge Österreich AG (AT)

( * ) Notice: Subject to any disclaimer, the term of this patent is extended or adjusted under 35 U.S.C. 154(b) by 62 days.

(21) Appl. No.: 11/641,612

(22) Filed: Dec. 19, 2006

(65) Prior Publication Data
US 2007/0137200 A1 Jun. 21, 2007

(30) Foreign Application Priority Data
Dec. 20, 2005 (AT) .............................. A 2037/2005

(51) Int. Cl.
*F02D 9/06* (2006.01)
*F02D 23/00* (2006.01)
*F02B 37/013* (2006.01)
*F02B 37/02* (2006.01)
*F02B 37/18* (2006.01)
*F02B 33/44* (2006.01)

(52) U.S. Cl. ............................ 123/323; 60/602; 60/612

(58) Field of Classification Search ................... 60/602, 60/612; 123/321–323; F02B 37/02, 37/013; F02D 9/06
See application file for complete search history.

(56) References Cited

U.S. PATENT DOCUMENTS

| 4,395,884 A | * | 8/1983 | Price ............................ 60/602 |
| 5,839,281 A | * | 11/1998 | Sumser et al. ................. 60/602 |
| 5,867,987 A | * | 2/1999 | Halimi et al. .................. 60/602 |
| 6,101,812 A | * | 8/2000 | Schmidt et al. ................ 60/602 |
| 6,694,735 B2 | * | 2/2004 | Sumser et al. ............. 60/605.2 |
| 6,973,787 B2 | * | 12/2005 | Klingel ......................... 60/612 |
| 2003/0178002 A1 | * | 9/2003 | Israel et al. .................. 123/321 |

(Continued)

FOREIGN PATENT DOCUMENTS

DE 19634107 C1 * 8/1997

(Continued)

OTHER PUBLICATIONS

A Translation DE 19634107 C1.*

*Primary Examiner*—Thai-Ba Trieu
(74) *Attorney, Agent, or Firm*—Robert W. Becker; Robert Becker & Assoc (57) ABSTRACT

A device for increasing the braking power of a multi-cylinder internal combustion engine of a vehicle during engine braking operation includes a turbo supercharger and an exhaust gas turbine for each stage thereof. A respective bypass line branches off from a region of two exhaust gas header pipes that can be blocked by throttle valves. Each bypass line communicates with a nozzle bore in a turbine wall. During an engine braking operation, two partial exhaust gas streams are branched off by the bypass lines from exhaust gas retained in blocked header pipes and strike turbine wheel blades at high pressure and high speed, whereupon the turbo supercharger is driven in an accelerated manner and compressed air is supplied to combustion chambers of the engine and is there effective to increase braking power.

17 Claims, 6 Drawing Sheets

U.S. PATENT DOCUMENTS

2007/0130946 A1 * 6/2007 Winsor et al. .............. 60/605.1

FOREIGN PATENT DOCUMENTS

| DE | 198 53 127 A1 | * | 3/2000 |
| DE | 10 2004 062 091 A1 | * | 7/2006 |
| DE | 10 2005 021 173 A1 | * | 11/2006 |
| DE | 10 2006 022 182 A1 | * | 11/2007 |
| EP | 1762716 A1 | * | 3/2007 |
| JP | 56 151222 A | * | 11/1981 |
| JP | 58027832 A | * | 2/1983 |
| JP | 08 246891 A | * | 9/1996 |

* cited by examiner

DEVICE FOR INCREASING THE BRAKING POWER OF A MULTI-CYLINDER INTERNAL COMBUSTION ENGINE OF A VEHICLE DURING AN ENGINE BRAKING OPERATION

The instant application should be granted the priority date of Dec. 20, 2005 the filing date of the corresponding Austrian patent application 2037/2005.

BACKGROUND OF THE INVENTION

The present invention relates to a device for increasing the braking capacity or power of a multi-cylinder internal combustion engine of a vehicle during an engine braking operation.

The present invention starts with internal combustion engines that have an engine braking device internal to the engine as well as a single or multi-stage turbosupercharger including, for each stage, an exhaust gas turbine and a charge air compressor, and in addition are provided with two exhaust gas header pipes via which the exhaust gas respectively discharged from a plurality of cylinders, combined in groups, can be conveyed to a turbine inlet. An engine braking device is known, for example, from EP 0736672 B1 in conjunction with an engine braking process. Such a process has been successful in hundreds of thousands of internal combustion engines installed in MAN trucks and buses, and is known to those of skill in the art as the MAN-EVB (exhaust valve-brake/EVB®). With this engine braking process, during the engine braking operation the throttle valves that are disposed in the exhaust gas line are in a throttling position in which the pertaining exhaust gas line is not entirely closed, so that a portion of the retained exhaust gas can pass the throttle valve via a narrow gap that remains open at the edge. This exhaust gas leakage is necessary in order to prevent a stopping or stalling of the internal combustion engine, even until it stops running, during overheating of the engine.

Although this known engine braking process produces excellent braking power, for many applications it is desirable to have an increase in braking power during an engine braking operation in order to provide greater relief for the further braking systems, such as retarders and service brakes, that are present in the vehicle, or to make them smaller. For this purpose, auxiliary measures are necessary to enable raising of the supercharged pressure during the engine braking operation, so that significantly higher exhaust gas counter pressures are established.

Various devices and methods are already known for achieving such an increase in supercharged pressure for increasing braking power. For this purpose IVECO uses a turbosupercharger having variable turbine geometry (VTG), whereby for increasing the braking power the turbine cross-section is varied. The drawback of this is that VTG turbochargers are considerably more expensive than normal turbo super charges and due to the many small movable parts in the turbine do not achieve the surface life and efficiency required for turbochargers. Instead of a VTG charger, Daimler Chrysler, for their version known as "Turbobrake" uses a turbosupercharger with which, via a displaceable ring in the turbine of the turbocharger, the throughput thereof can be changed over from engine operation to braking operation in the sense of small throughputs and a very high pressure drop so that the charge pressure can be raised during a braking operation. However, this turbosupercharger has similar drawbacks to a VTG turbocharger. Further examples for increasing braking power can be found in EP 077 0772 B1 and EP 082 1147 B1. In both cases, upstream of a throttle valve branching off from an exhaust gas line is a bypass line that either opens out into a collection chamber within the turbine housing and from which nozzle openings proceed in the direction of the turbine wheel, or the bypass line communicates with a single nozzle bore in an intermediate wall or partition of the turbine housing that on the outlet side is disposed ahead of a nozzle ring or guide baffles via which a nozzle stream is deflected and directed in the direction of the outer periphery of the turbine wheel. These two known solutions also have the drawback that they require modifications within the turbine or special turbines, and are therefore relatively expensive.

It is therefore an object of the present invention to provide a device for increasing the braking power of a multi-cylinder internal combustion engine of a vehicle according to which in the exhaust gas turbine of the turbosupercharger, or with a dual-stage turbosupercharger in the high pressure stage thereof, complicated components and modifications can be eliminated, so that the device can be realized in a straightforward and complicated manner, yet produces a relatively high increase in braking power.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Pursuant to the present application, during the engine braking operation each of the two exhaust gas header pipes can be blocked entirely by its own throttle valve. In addition, pursuant to the present invention, a bypass line branches off from each exhaust gas header pipe in a flow-related manner ahead of the region that can be blocked by the throttle valve. Each of these bypass lines inventively communicates with a nozzle bore formed in a wall of an exhaust gas turbine. These nozzle bores are disposed in a plane that extends perpendicular to the axis of the turbine wheel either a) parallel to one another or b) in an acute angle relative to one another and then merging with one another. Both nozzle bores open, in case a) via respective adjacent outlets, or in case b) via a common outlet, into the turbine chamber where they are directed tangentially onto the outer portion of the turbine wheel. In this way, it is inventively possible that during an engine braking operation, two partial exhaust gas streams can be branched off via the bypass lines from the exhaust gas retained in the exhaust gas header pipes upstream of the blocked throttle valves, wherein via the nozzle bores the partial exhaust gas streams, either in the form of two exhaust gas streams or combined to a single exhaust gas stream, enter the turbine chamber of the exhaust gas turbine, tangentially directed onto the outer portion of the turbine wheel, where they strike the blades of the turbine wheel at high pressure and at high speed, whereupon the turbosupercharger is driven in an accelerated manner and consequently compressed air can be introduced via the inlet line into the combustion chambers of the internal combustion engine, where the increased quantity of air and the increased counter pressure leads to a considerable increase of the braking power.

Since only the nozzle bores have to be provided in a turbine housing, the remainder of the structure of the turbosupercharger can be essentially unaltered relative to a conventional turbocharger. The remaining parts of the inventive device can be grouped together in a straightforward and compact manner and can be combined with a turbosupercharger as well as the exhaust gas header pipes.

Further specific features of the present invention will be explained in detail subsequently.

DESCRIPTION OF SPECIFIC EMBODIMENTS

Referring now to the drawings in detail, the inventive device is associated with a multi-cylinder internal combustion engine 1, especially a diesel engine, of a vehicle, such as any motor-driven land vehicle such as a truck, bus or other commercial vehicle, but also a passenger car, a rail vehicle, or a watercraft.

Figures 1, 2:
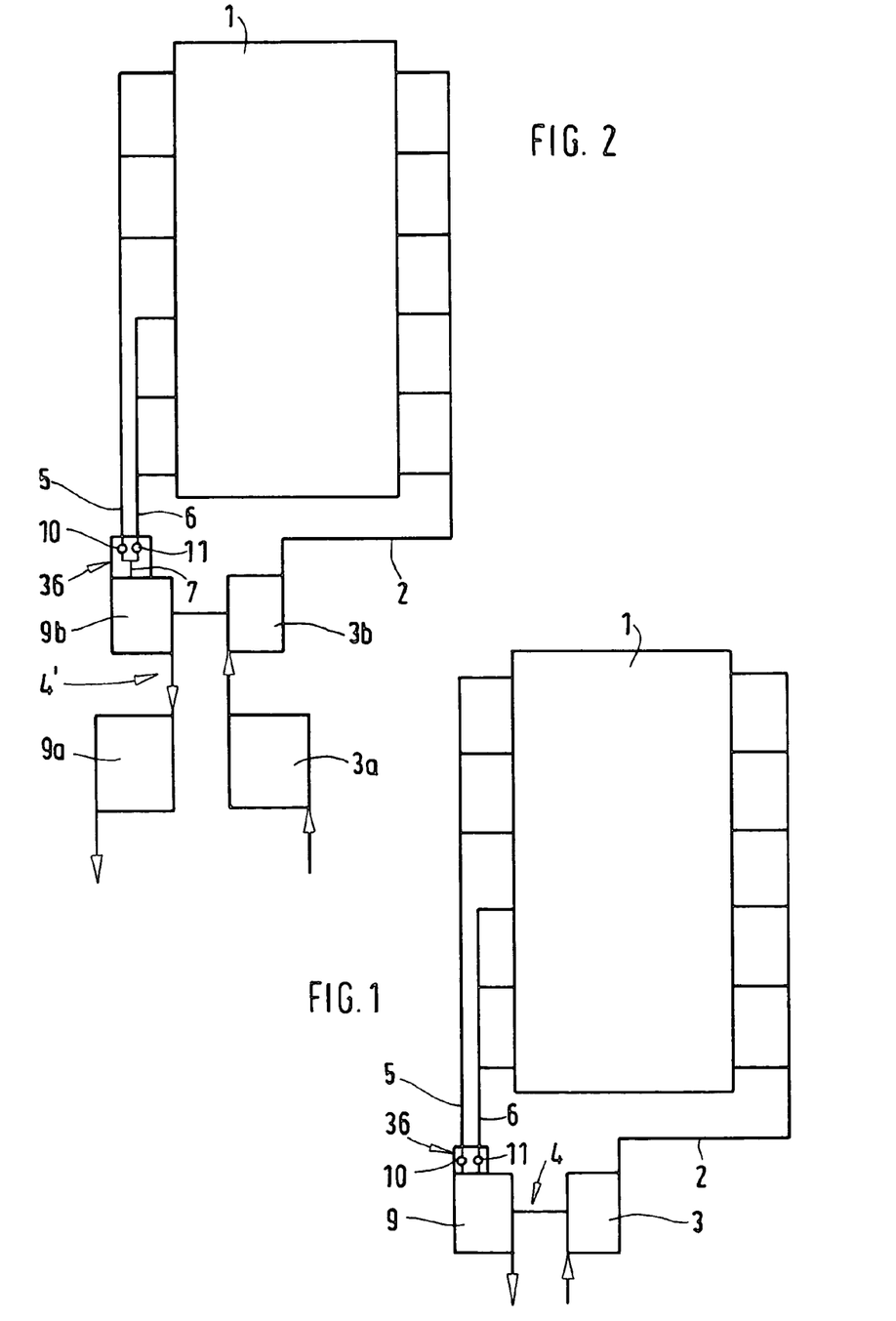
FIG. 1 shows a multi-cylinder internal combustion engine having a single-stage turbosupercharger and a pertaining inventive device.
FIG. 2 shows a multi-cylinder internal combustion engine having a dual-stage turbosupercharger and a pertaining inventive device.

The cylinders, i.e. combustion chambers, of the internal combustion engine 1 communicate via controlled inlet valves and subsequent inlet channels with a pressure pipe 2 that can be supplied with compressed charge air either from the compressor 3 of a single-stage exhaust-driven supercharger or turbosupercharger 4 (see FIG. 1) or the compressors 3a, 3b of a dual-flow turbo super charger 4' (see FIG. 2). In the case of the dual-stage system of FIG. 2, the compressor of the low-pressure stage is designated 3a and the compressor of the high-pressure stage is designated 3b. The cylinders or combustion chambers of the internal combustion engine 1 furthermore communicate via controlled outlet valves and subsequent outlet channels, combined in groups, in each case with one of two exhaust gas header pipes 5, 6. Via each of these two exhaust gas header pipes 5, 6, the exhaust gas from the connected group of cylinders can be supplied either via a common end channel 7 (see FIG. 2) to an inlet 8 of a single-flow exhaust gas or exhaust-driven turbine 9 or 9a, or to a respective inlet, 8a, 8b of a dual-flow exhaust gas turbine 9 of a turbosupercharger 4 or 4'. With a dual-flow turbosupercharger 4' (see FIG. 2) the exhaust gas turbine of the low-pressure stage is designated 9a and the exhaust gas turbine of the high-pressure stage is designated 9b.

A throttle valve 10, 11 is disposed and can be adjusted in each of the two exhaust gas header pipes 5, 6 in such a way that the pertaining header pipe 5 or 6 can be entirely blocked during an engine braking operation.

Figures 3, 4:
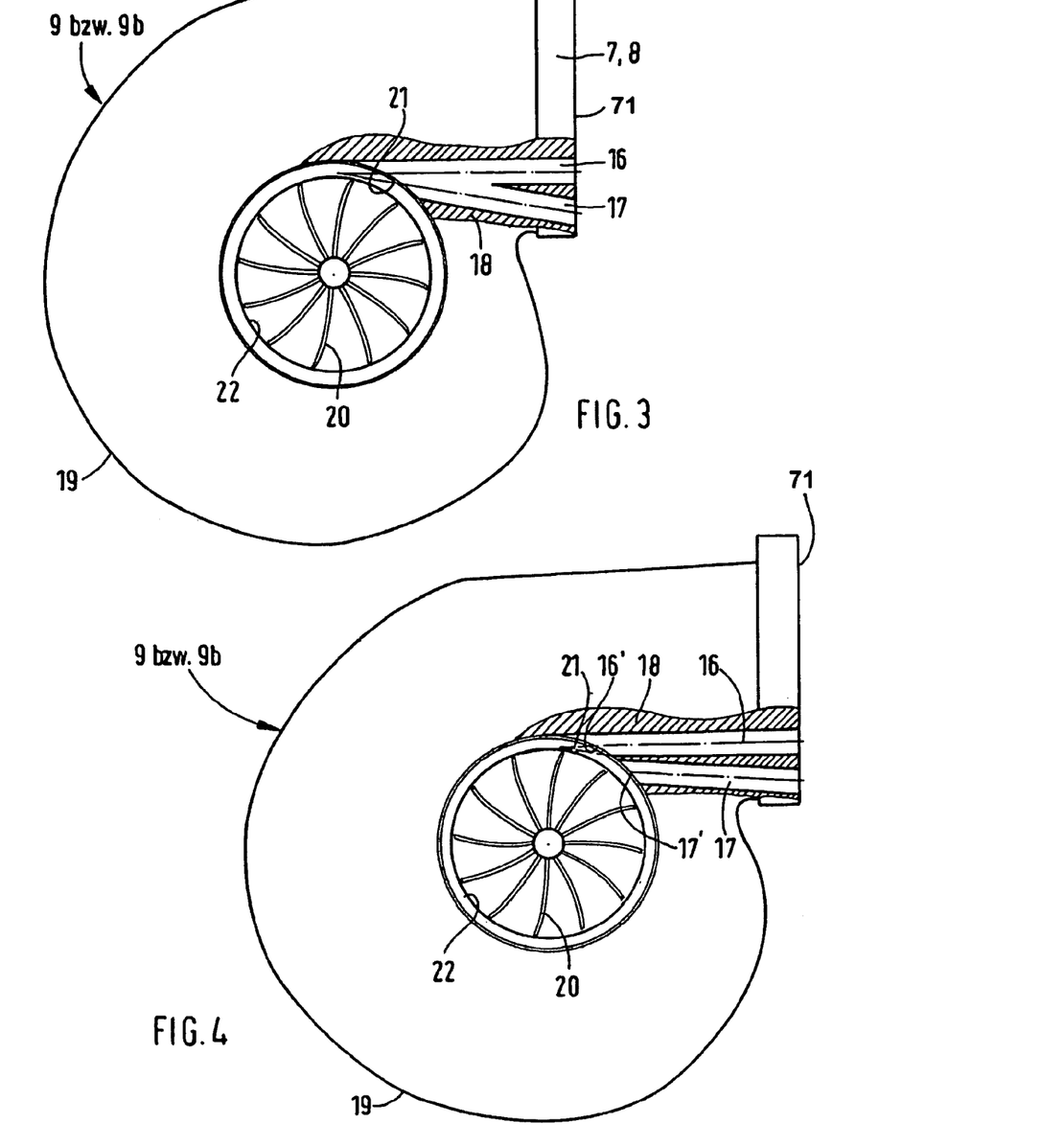
FIG. 3 shows the exhaust gas turbine of a turbosupercharger (i.e. the high pressure turbine of a two-stage turbosupercharger) with parts of the inventive device pursuant to a first embodiment.
FIG. 4 shows the exhaust gas turbine of a turbosupercharger (i.e. the high pressure turbine of a two-stage turbosupercharger) with parts of the inventive device pursuant to a second embodiment.
Figure 5:
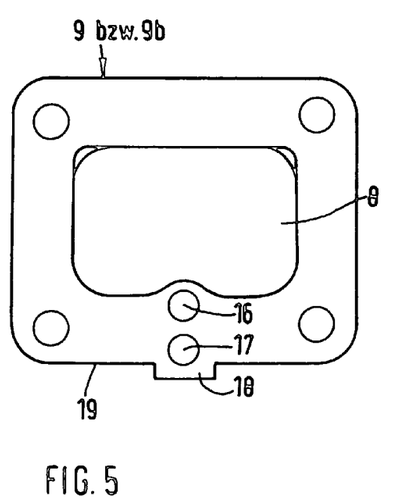
FIG. 5 is a view of the inlet region of a single-flow exhaust gas turbine.

From each exhaust gas header pipe 5, 6, ahead of the region that can be blocked by the throttle valve 10 or 11, a bypass line 12 or 13 branches off in a flow-related manner, with each bypass line communicating with a nozzle bore 16 or 17 in the interior of the turbine housing. These nozzle bores 16, 17 are formed in a wall portion 18 of the turbine housing 19 of the exhaust gas turbine 9 of a single-stage turbosupercharger 4 or exhaust gas turbine 9b of the high-pressure stage of a dual-stage turbosupercharger 4', and in particular in a plane disposed perpendicular to the axis of the turbine wheel 20. In this plane, the two nozzle bores 16, 17 can either a) extend substantially parallel and slightly spaced-apart next to one another, and thus each have an outlet 16' or 17' next to one another (see FIG. 4), or b) extend at an acute angle relative to one another, merge with one another, and have a common outlet 21 (see FIG. 3). In each case, the two nozzle bores 16, 17 in their plane open out tangentially, in case a) via their respective separate outlet 16', 17', and in case b) via their common outlet 21, into the turbine chamber 22 of the exhaust gas turbine 9 or 9b, and in particular directed onto the outer portion of the turbine wheel 20.

The nozzle bore 16, 17 themselves can either have a cylindrical configuration or can taper slightly conically to the respective outlets 16', 17' or 21. The two nozzle bores 16, 17 preferably have the same configuration, but can also have different diameters or conical angles.

The connection between the two exhaust gas header pipes 5, 6 and the nozzle bores 16, 17 can either be established in an uncontrolled manner via permanently open bypass channels 12, 13 (see, for example, FIGS. 6 and 9), or in a controlled manner via a respective controllable valve 14 or 15 (see FIGS. 8 and 10) in the bypass line 12 or 13. With these valves 14, 15, it is possible to block off each of the two bypass lines 12, 13, or to switch them to an open position for the purpose of bypassing the throttle valves 10 or 11 disposed in the blocking position.

In this way it is possible, during an engine braking operation and after closing of the throttle valves 10, 11, to branch off two partial exhaust gas streams from the exhaust gas that is retained in the blocked exhaust gas header pipes 5, 6 via the bypass lines 12, 13; via the nozzle bores 16, 17, either in the form of two adjacent exhaust gas streams or combined to a single exhaust gas stream, the partial exhaust gas streams then strike the blades of the turbine wheel 20 at high pressure and high speed, as a result of which the turbosupercharger 4 or 4' can be driven in an accelerated manner, whereupon compressed air can be supplied to the combustion chambers of the internal combustion engine, where it is effective to increase the braking power.

Figure 11:
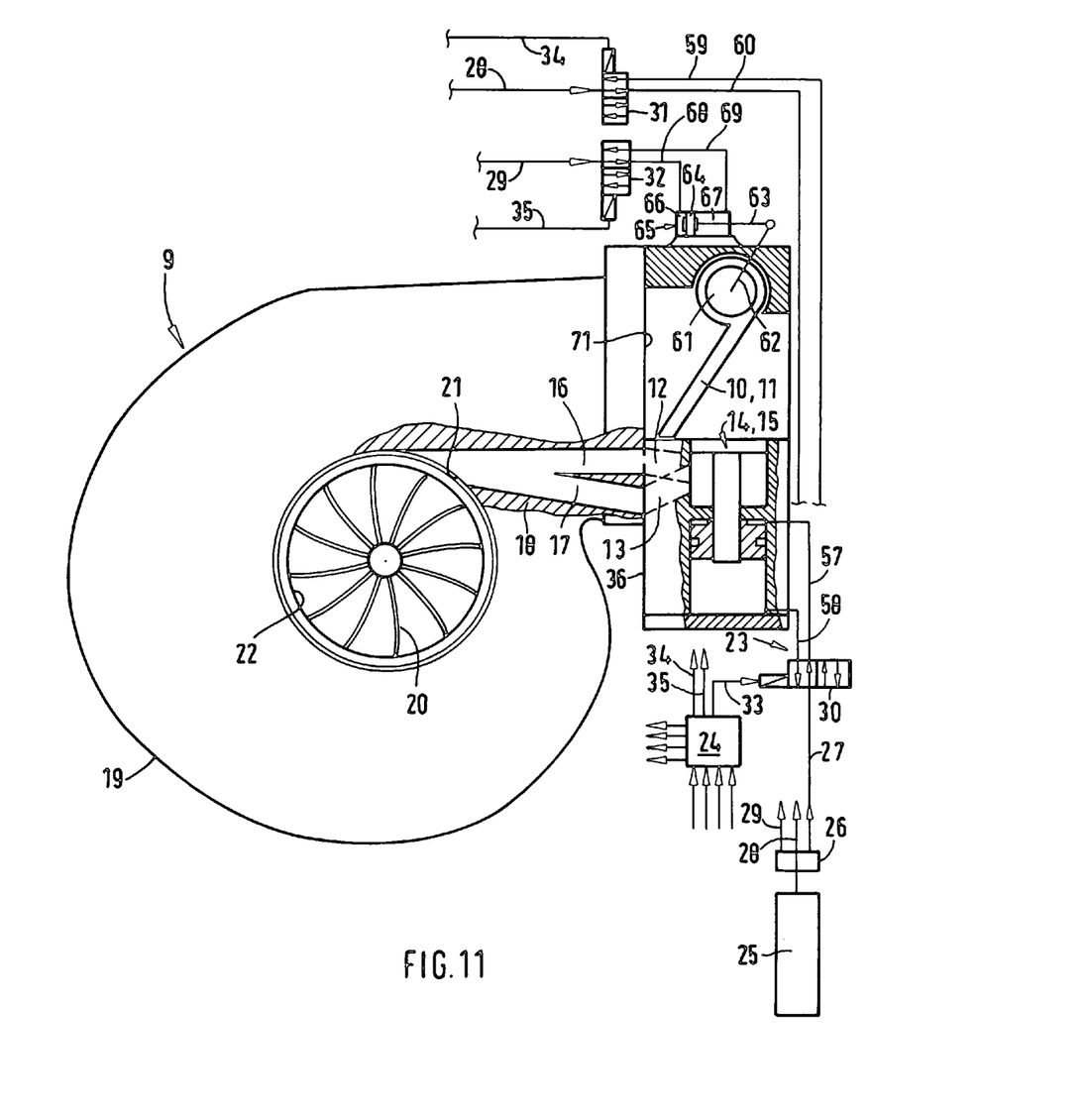
FIG. 11 shows the exhaust gas turbine of FIG. 3 combined with the control module of FIGS. 8, 10 and supplemented by an operation-controlling device.

The two controllable valves 14, 15, to the extent that they are provided, are preferably actuatable by means of electromagnetic setting devices 23 that, as shown in FIG. 11, receive their control commands from a control electronics 24, which can be an independent device or an onboard computer or vehicle master computer of the vehicle. A control strategy for the opening, keeping open, and closing of the two valves 14, 15 according to data is entered or stored in this control electronics 24. This control strategy is preferably designed such that at the beginning of an engine braking operation, or somewhat thereafter, upon recognition of an increased engine braking requirement, the two valves 14, 15 are set to an open position, and when the engine speed drops below a prescribed speed, the valves are again changed over into the blocking position. However, in the aforementioned structural modification the inventive device also enables control and regulation engagement beyond the engine braking operation in certain normal engine operation phases. For example, the control strategy entered into the control electronics 24 can also be designed such that with the throttle valves 10, 11 open, in other words with the exhaust gas header pipes 5, 6 open, in certain engine load and/or engine speed ranges, by selected opening, keeping open, and again closing of the valves 14, 15, and hence as a result a directed introduction of a gas stream or two gas streams into the turbine chamber 22, in addition to the two normal exhaust gas flows (from the header pipes 5 and 6), it is possible to achieve a change of turbine speed similar to the situation with a variable turbine geometry.

In principle, the two valves 14, 15 and the pertaining setting devices 23 can also be designed such that by means of the valves 14, 15 the bypass lines 12, 13 can not only be controlled so as to be opened or closed, but also their effective opening class-section can be influenced.

The embodiments of the inventive device illustrated in the drawings will be explained in greater detain subsequently.

Figure 6:
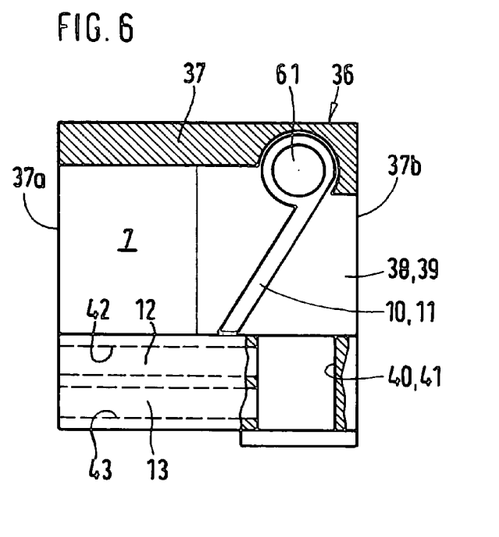
FIG. 6 is a cross-sectional view of one embodiment of a control module that combines a number of parts of the inventive device and is associated with a single-flow exhaust gas turbine such as that of FIG. 5.
Figure 7:
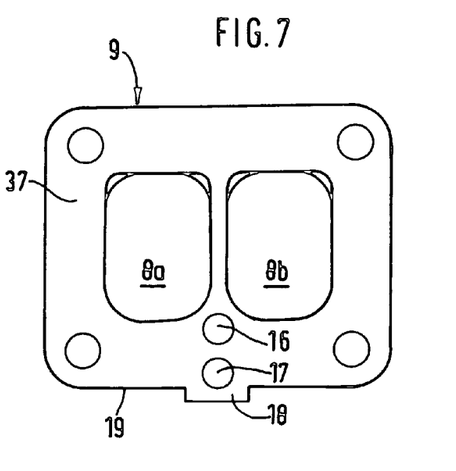
FIG. 7 is a view of the inlet region of a dual-flow exhaust gas turbine.
Figure 8:
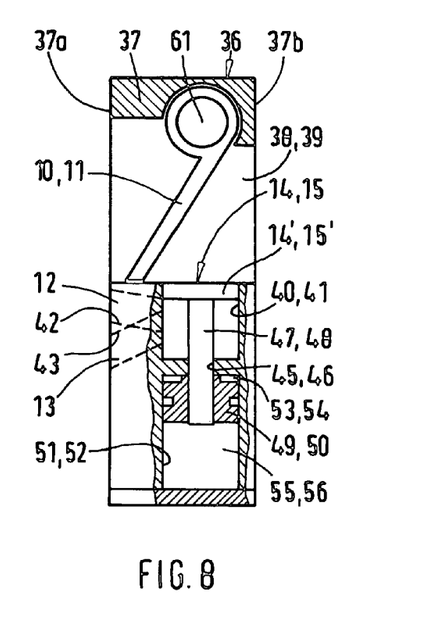
FIG. 8 is a cross-sectional view of a further embodiment of a control module that similarly combines a number of parts of the inventive device and is associated with a dual-flow exhaust gas turbine such as that of FIG. 7.
Figure 9:
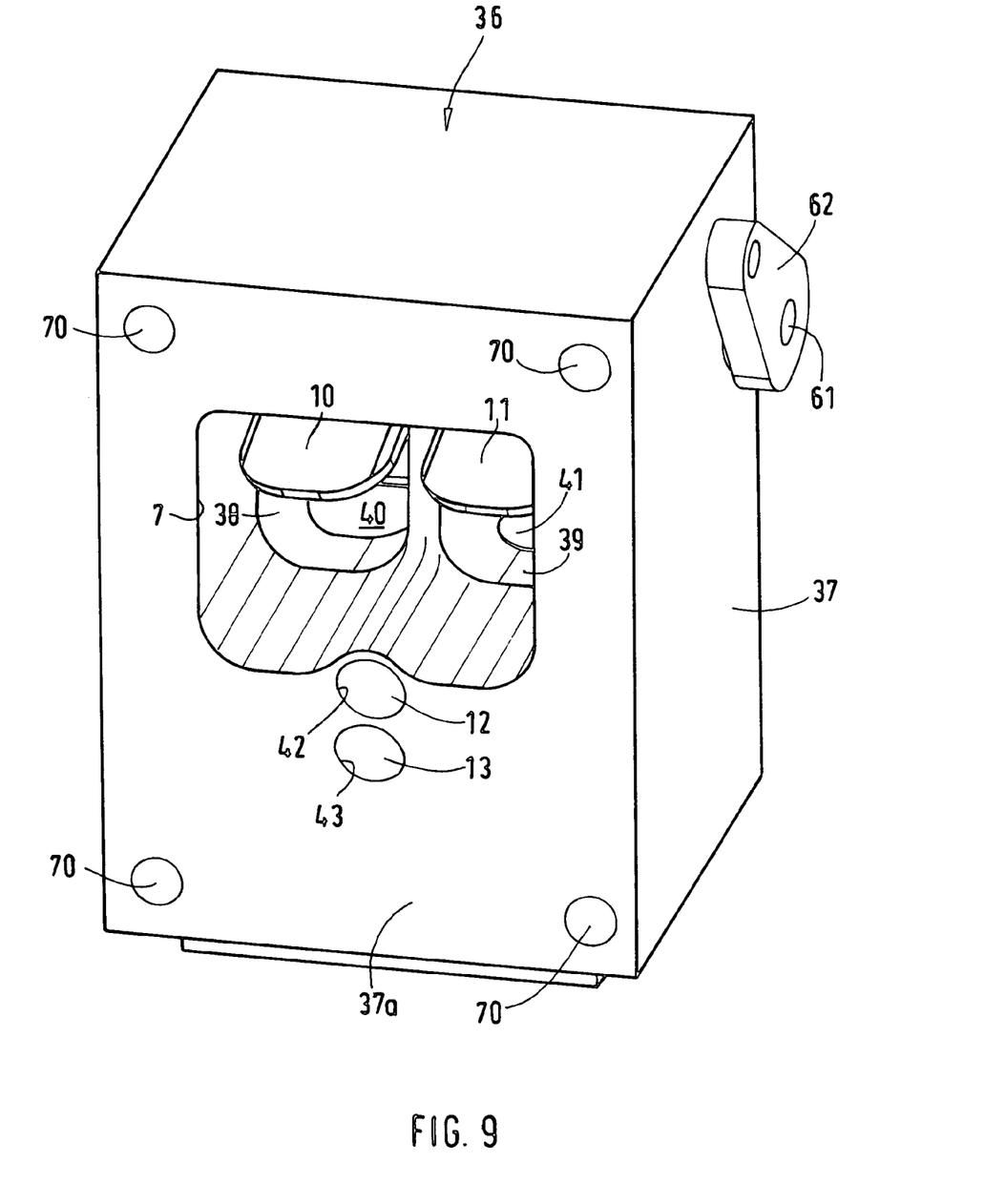
FIG. 9 is a perspective view of the control module of FIG. 6 on that side facing the turbine inlet.
Figure 10:
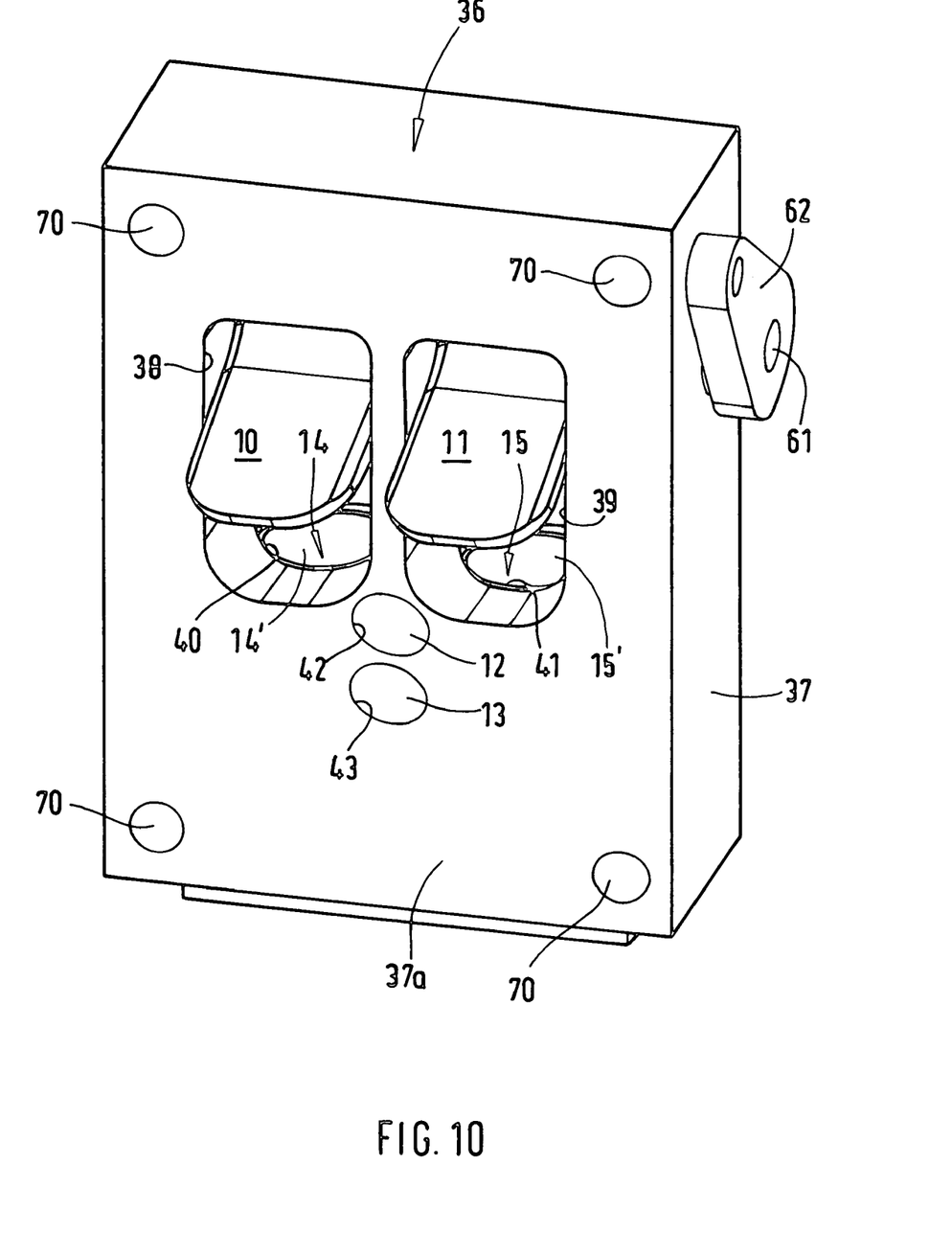
FIG. 10 is a perspective view of the control module of FIG. 8 on that side facing the turbine inlet.

In the two embodiments illustrated in FIGS. 6, 9 on the one hand and 8, 10, 11 on the other hand, the two throttle valves 10, 11 are mechanically coupled with one another and can be actuated synchronously by means of an electro-pneumatic setting device 23 that corresponds approximately to that via which the valves 14, 15 of the embodiment of FIGS. 8, 10, 11 can be actuated. In this connection, the central compressed air source in both embodiments is a compressed air tank 25 that is in the vehicle and that is supplied by a compressor as needed. As shown in FIG. 11, proceeding from the compressed air tank 25 a multi-sectioned safety valve 26 is provided, from the outputs of which compressed air lines 27, 28, 29 proceed.

With the embodiment of FIGS. 8, 10, 11, all three compressed air lines 27, 28, 29 are needed. In the embodiment of FIGS. 6, 9, in contrast, only the pressure line 29 is of interest in conjunction with the invention.

In the embodiment of FIGS. 8, 10, 11, the compressed air line 27 leads to a gate/shutoff valve 30 as part of the setting device 23 for the valve 14, and the compressed air line 28 leads to a gate/shutoff valve 31 that is identical to the valve 30 and similarly forms a portion of the setting device 23 for the valve 15. The compressed air line 29 leads to a gate/shutoff valve 32 that is part of the electro-pneumatic setting device for the synchronously actuatable throttle valves 10, 11. The electromagnets of the gate/shutoff valves 30, 31, 32 receive their setting or adjustment commands from the control electronics 24 via corresponding control lines 33, 34, 35. The two outputs of each gate/shutoff valves 30, 31, 32 are connected with a respective pressure chamber ahead of and behind a control piston, via which the respective valve 14, 15, or a control or adjustment device that is connected with the throttle valves 10, 11, is indirectly actuatable, for example by means of a rod. Further details of this will be described subsequently.

In a preferred configuration, with both embodiments pursuant to FIGS. 6, 9 on the one hand and 8, 10, 11 on the other hand, a portion of the inventive device is integrated in a control module 36 that forms the end of the exhaust gas header pipes 5, 6 at the supercharger side. In general, the control module 36 is provided with a base structure 37 having a front end face 37a that faces the supercharger, and an end face 37b that is parallel thereto and faces away from the supercharger. Provided in the base structure 37 of the control module 36 of the embodiment of FIGS. 6, 9 are two parallel exhaust gas channels 38, 39 that extend next to one another, wherein the inlet side of each channel communicates with one of the exhaust gas header pipes 5, 6, and at the other side opens out into the single-flow exhaust gas channel 7, which is also formed in the base structure 37 of the control module 36.

Also with the embodiment of FIGS. 8, 10, 11, two exhaust gas channels 38, 39 are provided next to one another in the base structure 37 of the control module 36, although here they are continuous from the rear toward the front; at the input side each of the input channels communicates with one of the exhaust gas header pipes 5, 6, and at the outlet sides communicates with one of the turbines 8a, 8b.

In both of the embodiments, one of the throttle valves 10, 11 is built into each exhaust gas channel 38, 39 in such a way that it can be completely blocked by the throttle valve.

Furthermore, also integrated into the base structure 37 of the control module 36 are the bypass lines 12, 13, and in the embodiment of FIGS. 8, 10, 11 in addition also the valves 14, 15 that open and close them as well as at least portions of the respectively pertaining setting devices 23.

In this connection, the bypass lines 12, 13 are realized in the base structure 37 of the control module 36 as follows. A blind hole 40 or 41, as a first portion of the bypass line 12 or 13, branches off from each of the two exhaust gas channels 38, 39 essentially perpendicular thereto and either upwardly or, as illustrated in the drawing, downwardly. Branching off from each blind hole 40 or 41, as a second portion of the bypass line 12 or 13, is a bore 42, 43 that opens out at the front side 37a of the control module base structure 37 and that communicates with one of the two nozzle bores 16 or 17 (bore 42 with bore 16 and bore 43 with bore 17) that are in the interior of the turbine housing.

In the embodiment of FIGS. 8, 10, 11, the pertaining valve 14 or 15, with its valve disc 14' or 15', is movable back and forth in the blind hole 40, 41, i.e. the first portion of the bypass line 12 or 13, between a blocking position (as shown in FIGS. 8, 10 and 11) and an opening position where the valve disk has entered into the blind hole 40 or 41, and as the case may be, can also be adjustable in intermediate positions. The valve disc 14' or 15' of the valve 14 or 15 is coupled to a control element 49, 50 of the pertaining setting device 23 by means of a shaft 47, 48 that is guided coaxially in a bore 45, 46 disposed within the control module base structure 37. In the illustrated embodiment of an electro-pneumatic setting device 23, this control element 49 or 50 is a piston that within the control module 36, in a chamber 51 or 52 that in the base structure 37 thereof is coaxial to the blind hole 40 or 41, separates a forward pressure chamber 53 or 54 from a rear pressure chamber 55 or 56. The two pressure chambers 53, 55 that pertain in the valve 14 are connected with the gate/shutoff valve 30 via pressure lines 57, 58. The two pressure chambers 54, 56 that pertain to the valve 15 are connected with the gate/shutoff valve 31 via pressure lines 59, 60. For actuation of the two valves 14 or 15 in one or the other direction, their pressure chambers are alternately capable of being supplied with compressed air or of being relieved of pressure, depending upon the control position of the pertaining gate/shutoff valve 30, 31.

In both embodiments pursuant to FIG. 6, 9 on the one hand and 8, 10, 11 on the other hand, for a synchronous operation the two throttle valves 10, 11 are secured to a control shaft 61 that is rotatably mounted in a receiving bore that extends transversely through the base structure 37 of the control module 36, wherein the control shaft 61 is coupled, via a lever 62 that is disposed on the outside, with a piston rod 63, on the free end of which is seated a piston 64 that in a pneumatic pressure cylinder 65 separates a forward pressure chamber 66 from a rear pressure chamber 67. The two pressure chambers 66, 67 of the pressure cylinder 65 are connected via pressure lines 68, 69 with a gate/shutoff valve 32 via which, for displacement of the piston 64 and hence of the throttle valve 10, 11, in one or the other direction, the pressure chambers 66, 67 are alternately capable of being supplied with compressed air or of being relieved of pressure. The pressure cylinder 65 is secured in a suitable manner to the outside of the base structure 37.

The control module 36 is to be installed as a completely preassembled structural unit between an end flange at the end of the exhaust gas header pipes 5, 6 and a connection flange 71 that is provided at the inlet region of the exhaust gas turbine 9 or 9b. At this location, the control module 36 is to be secured by means of a plurality of screw connections that pass through mounting holes 70 (see, for example, FIGS. 9 and 10) formed in the base structure 37 as well as in the flanges.

The specification incorporates by reference the disclosure of Austrian priority document 2037/2005 filed Dec. 20, 2005.

The present invention is, of course, in no way restricted to the specific disclosure of the specification and drawings, but also encompasses any modifications within the scope of the appended claims.

What I claim is:

1. A device for increasing the braking power of a multi-cylinder internal combustion engine of a vehicle during an engine braking operation and having an engine braking device internal to the engine and a charge air compressor mechanism, comprising:

a single or multi-stage turbosupercharger including an exhaust gas turbine for each stage;

two exhaust gas header pipes, wherein exhaust gas discharged from a plurality of the cylinders, combined in groups, is respectively adapted to be conveyed via said exhaust gas header pipes to an inlet of the exhaust gas turbine; and a respective throttle valve for each of said exhaust gas header pipes, wherein each exhaust gas header pipe is adapted to be blocked by one of said throttle valves during an engine braking operation, wherein a respective bypass line branches off from a region of each of said exhaust gas header pipes that is adapted to be blocked, wherein each of said bypass lines communicates with a nozzle bore formed in a wall of the exhaust gas turbine, wherein said nozzle bores are disposed in a plane that extends perpendicular to an axis of a turbine wheel that is disposed in a chamber of the exhaust gas turbine, wherein said nozzle bores either a) extend parallel next to one another and have respective outlets adjacent to one another, or b) extend at an acute angle to one another, merge with one another, and have a common outlet, wherein said nozzle bores open out, via said respective outlets or said common outlet, into said turbine chamber, where said nozzle bores are directed tangentially onto an outer portion of said turbine wheel, wherein by means of said bypass lines, during an engine braking operation, two partial exhaust gas streams are adapted to be branched off from exhaust gas retained in blocked ones of said exhaust gas header pipes, wherein via said nozzle bores said partial exhaust gas streams, either in the form of two exhaust gas streams or combined to a single exhaust gas stream, are then adapted to strike blades of said turbine wheel at high pressure and at high speed, whereupon said turbosupercharger is adapted to be driven in an accelerated manner and consequently compressed air is adapted to be supplied to combustion chambers of said internal combustion engine and is there effective to increase braking power.

2. A device according to claim 1, wherein a respective controllable valve is provided for each of said bypass lines, and wherein each bypass line is adapted to be blocked or to be opened by a respective one of said controllable valves.

3. A device according to claim 2, wherein an electro-pneumatic or electro-magnetic setting device is provided for each of said two controllable valves, and wherein said setting device receives control commands from a control electronics.

4. A device according to claim 3, wherein said control electronics is an onboard computer or a vehicle master computer.

5. A device according to claim 3, wherein a control strategy for opening, keeping open and closing of said two valves according to data is adapted to be entered or stored in said control electronics.

6. A device according to claim 5, wherein said control strategy of said control electronics is designed such that at the beginning of an engine braking, or chronologically thereafter, upon recognition of an increased engine braking demand said two valves are adapted to be set to open, and when an engine speed drops below a prescribed speed said valves are adapted to be again placed in a blocking position.

7. A device according to claim 5, wherein said control strategy of said control electronics is also designed for influencing turbine operation beyond engine braking phases, namely for normal engine operation, such that if said throttle valves are open and said exhaust gas header pipes are open, in certain engine load and/or speed ranges, via selected opening, keeping open and again closing of said valves, and hence as a result a directed introduction of a gas stream into the exhaust gas turbine, in addition to two normal exhaust gas volume streams it is possible to produce a turbosupercharger speed change in the sense of a variable turbine geometry.

8. A device according to claim 3, wherein said two valves and the pertaining setting devices are designed such that by means of said valves said bypass lines are adapted not only to be controlled for opening and closing, but also to have their effective opening cross-section influenced, throttled or variably set.

9. A device according to claim 2, wherein a portion of said device are integrated into a compact control module, and wherein said control module is a prefabricated and preassembled structural unit that is adapted to be installed between a flange on a turbine inlet side and a flange disposed at an end of said two exhaust gas header pipes.

10. A device according to claim 9, wherein said control module has a base structure, wherein two exhaust gas channels are provided next to one another in said base structure, wherein an inlet side of each of said exhaust gas channels communicates with one of said exhaust gas header pipes, wherein an outlet side of said exhaust gas channels opens out into a common exhaust gas channel disposed in said base structure, wherein one of said throttle valves is installed in each of said exhaust channels, and wherein said bypass lines are also formed in said base structure of said control module.

11. A device according to claim 10, wherein each of said bypass lines has two portions in said base structure of said control module, wherein a first portion is formed by a blind hole that branches off essentially perpendicularly upwardly or downwardly from one of said exhaust channels , wherein a following second portion is formed by a bore that proceeds from a respective one of said blind holes and opens out at a front, turbine-side end face of said base structure of said control module, and wherein said bore communicates with one of said nozzle bores.

12. A device according to claim 10, wherein said throttle valves are secured to a control shaft for synchronous operation, wherein said control shaft is rotatably mounted in a receiving bore that extends transversely through said base structure of said control module, wherein said control shaft is coupled via a lever, which is disposed externally of said base structure, to a piston rod at a first end thereof, wherein a piston is disposed at a second end of said piston rod, wherein said piston is disposed in a pneumatic pressure cylinder and separates a forward pressure chamber from a rear pressure chamber, wherein said two pressure chambers are connected via respective pressure lines with outlets of a gate/shutoff valve via which, depending upon an operating position thereof, said pressure chambers are adapted to be alternately supplied with compressed air or relieved of pressure for displacement of said piston and hence of said throttle valve in one or the other direction.

13. A device according to claim 12, wherein said pressure cylinder (65) is secured to an outside of said base structure of said control module.

14. A device according to claim 9, wherein said control module has a base structure, wherein two continuous exhaust gas channels are provided next to one another in said base structure, wherein an inlet of each of said exhaust gas channels communicates with one of said exhaust gas header pipes and an outlet of said exhaust gas channels communicates with a turbine inlet, wherein one of said throttle valves is installed in each of said exhaust gas channels, and wherein said bypass lines and said valves that control opening and closing thereof as well as at least parts of said pertaining setting devices are integrated in said base structure of said control module.

15. A device according to claim 14, wherein a first portion of one of said bypass lines branches off in said base structure of said control module from each of said exhaust gas channels essentially perpendicularly upwardly or downwardly in the form of a blind hole, wherein a valve disc of a pertaining one of said valves is movable back and forth in said blind hole between a blocking position and an opening position and is optionally also adapted to be adjusted into intermediate positions, wherein a respective further portion of each of said bypass lines proceeds from each of said blind holes as a bore that opens out at a front end face of said base structure of said control module, wherein said bores communicate with one of said nozzle bores, and wherein said valve disc of each valve is coupled to a control element of the pertaining setting device via a shaft that is coaxially guided in a bore in said base structure of said control module.

16. A device according to claim 15, wherein said setting device is an electro-magnetic setting device that includes a control piston as said control element, wherein said shaft of each of said valves is connected to one of said control pistons, wherein in a control chamber, which is formed in said base structure behind said blind hole and separate therefrom and coaxial thereto, said control piston separates a forward pressure chamber from a rear pressure chamber, wherein said pressure chambers are connected via a respective pressure line to an output of a gate/shutoff valve, one input of which is connected to a compressed air source and another input of which is connected to the atmosphere, so that, depending upon the operating position of the respective gate/shutoff valve, said pressure chambers are adapted to be alternately supplied with compressed air or relieved of pressure for actuation of said valves in one or the other direction.

17. A device according to claim 1, wherein said nozzle bores have a cylindrical configuration or are slightly conically tapered in the direction toward their outlets.

\* \* \* \* \*